United States Patent [19]
Franklin

[11] Patent Number: 6,061,770
[45] Date of Patent: May 9, 2000

[54] SYSTEM AND METHOD FOR REAL-TIME DATA BACKUP USING SNAPSHOT COPYING WITH SELECTIVE COMPACTION OF BACKUP DATA

[75] Inventor: Chris Franklin, Merrimack, N.H.

[73] Assignee: Adaptec, Inc., Milpitas, Calif.

[21] Appl. No.: 08/963,754

[22] Filed: Nov. 4, 1997

[51] Int. Cl.[7] .............................. G06F 12/00; G06F 12/16
[52] U.S. Cl. ...................... 711/162; 711/161; 711/200; 711/221
[58] Field of Search .................................. 710/52; 711/6, 711/161, 162, 203, 221, 200

[56] References Cited

U.S. PATENT DOCUMENTS

| | | | |
|---|---|---|---|
| 4,654,819 | 3/1987 | Stiffler et al. | 711/162 |
| 5,535,381 | 7/1996 | Kopper | 710/52 |
| 5,758,067 | 5/1998 | Makinen et al. | 711/162 |

*Primary Examiner*—Tuan V. Thai
*Attorney, Agent, or Firm*—Cesari and McKenna, LLP

[57] ABSTRACT

A backup system enables unmodified data to be copied to a read-only backup container that is smaller than the read-write container. The system creates and maintains structures that map the unmodified copies of data in the backing store container to locations in the read-write container. The mapping structures contain addresses of locations in the backing store container where collections of blocks of data are stored based on the original data block address of the data in the read-write container. In order to obtain the address of the location in the backing store container where a block of data is stored, the system converts the physical block number of the read-write block of data into a physical block address in the backing store container which actually contains the data. By using these mapping structures, the system provides an efficient manner of utilizing a smaller backing store container or less storage space, since the data modified during the snapshot backup process is usually substantially less than read-write on-line data.

10 Claims, 7 Drawing Sheets

SYSTEM AND METHOD FOR REAL-TIME DATA BACKUP USING SNAPSHOT COPYING WITH SELECTIVE COMPACTION OF BACKUP DATA

FIELD OF THE INVENTION

The invention relates generally to the field of computer systems and more particularly provides a method for storing computer systems data to be backed up in logical disk partitions that are smaller than the logical disk partitions containing the on-line data.

BACKGROUND OF THE INVENTION

Computer systems often perform data backups on computer files to enable recovery of lost data. To maintain the integrity of the backed-up data, a backup process must accurately back up all files or back up all modified files after the most recent backup process. A backup program copies each file that is identified as a candidate for backup from an on-line storage device to a secondary storage device. On-line storage devices are configured from on one or more disks into logical units of storage space referred to herein as "containers". Containers are created and maintained by a software entity called the "container manager". Each type of container on the system has an associated driver which processes system requests on that type of container. After a complete backup operation, the backup program verifies the backed up files to make sure that the files on the secondary storage device(usually a tape) were correctly backed up. One problem with the backup process is that files may change during the backup operation.

To avoid backing up files modified during the backup process and to enable applications to access files during the backup operation, the container manager periodically (e.g. once a day) performs a procedure that takes a "snapshot" or copy of each read-write container whereby, the container manager creates a read-only container which looks like a copy of the data in the read-write container at a particular instant in time. Thereafter, the container manager performs a "copy-on-write" procedure where an unmodified copy of data in the read-write container is copied to a read-only backup container every time there is a request to modify data in the read-write container. The container manager uses the copy-on-write method to maintain the snapshot and to enable backup processes to access and back up an unchanging, read-only copy of the on-line data at the instant the snapshot was created.

During the backup procedure, the container manager creates a "snapshot" container, a "snapshotted" container and a "backing store" container. After the container manager takes the snapshot, the snapshotted container driver processes all input/output (I/O) requests, to store data in or retrieve data from a read-write container. The snapshotted container driver processes all I/O requests to retrieve data from the read-write container by forwarding them directly to the read-write container driver. However for all I/O requests to modify data in a read-write container, the container manager first determines whether the requested block of data has been modified since the time of the snapshot. If the block has not been modified, the container manager copies the data to the backing store container and then sets an associated bit map flag in a modified-bit-map table. The modified-bit-map table contains a bit map with each bit representing one block of data in the read-write container. After setting the modified-bit-map flag, the snapshotted container driver forwards the I/O storage request to the read-write container driver.

When the backup process begins execution, it invokes I/O retrieval requests from the snapshot container. A file system, which is a component of the operating system translates the file-oriented I/O request into a logical address and forwards the request to a snapshot container driver. The snapshot container driver checks the associated bit map in the modified-bit-map table for the requested block of data. If the bit map is set, the snapshot container driver forwards the request to the backing store container driver to retrieve the unmodified copy of that block from the backing store container. The backing store container driver then processes the backup process retrieval request. If the bit map is not set, this means that the block has not been modified since the snapshot was created. The snapshot container driver forwards the request to the read-write container driver to retrieve a copy of that block of data from the read-write container. Upon retrieving the file from the backing store container or the read-write container, the backup process backs it up. After a complete backup operation, the container manager deletes the snapshotted container, the snapshot container, the backing store container, and the modified-bit-map table and thereafter forwards all I/O requests directly to the read-write container driver.

The problem with the current copy-on-write process is that the read-write container and the backing store container must be the same size to maintain a fixed mapping between the read-write container blocks and the copied backing store container blocks. Usually, however, only a small amount of the on-line data is modified between backup operations, the present copy-on-write process therefore utilizes storage space inefficiently. Therefore, it is an object of the present invention to provide a system that allows copy-on-write procedures to be performed on a backing store container that is smaller than the read-write container while ensuring that the read-write container blocks are accurately mapped to the copied backing store container blocks.

SUMMARY OF THE INVENTION

In the backup system described herein, the container manager creates and maintains structures that map the unmodified copies of data in the backing store container to locations in the read-write container. The mapping structures which may be stored in memory and/or on disks, contain addresses of locations in the backing store container where collections of blocks of data are stored based on the original block address in the read-write container. In order to obtain the address of the location in the backing store container where a block of data is stored, the container manager converts the physical block number of the read-write block of data into a physical block address in the backing store container which actually contains the data. By using these mapping structures, the system provides an efficient manner of utilizing a smaller backing store container or less storage space, since the data modified during the snapshot backup process is usually substantially less than read-write on-line data.

Specifically, in the preferred embodiment of the invention, when the container manager creates a backing store container, it creates a level 1 table and stores the level 1 in memory and in the first space in the backing store container. When a block of data is copied from the read-write container to the backing store container, the container manager creates a level 2 table, a 2K longword space in the backing store container, and stores the block of data in the level 2 table. The container manager thereafter stores the beginning block number of the level 2 table in a level 1 table entry. The level 1 table is always resident in memory but, the level 2 table is cached in memory as blocks stored in that table is needed.

Before the container manager copies a block of data into the backing store container, it converts the physical block number in the read-write container into a virtual block number. The container manager uses bits zero to three of the virtual block number as the block offset, bits four to fifteen as the second index, and bits sixteen to thirty-one as the first index. The container manager utilizes the value of first index to access an entry in the level 1 table. It then checks to see if a level 2 table is available. If a level 2 table is not available the container manager creates a level 2 table; otherwise, it utilizes the available level 2 table. If the location of the block is outside of the existing level 2 table's access range, the container manager creates a new level 2 table. It thereafter stores the beginning block number of the level 2 table in the level 1 table entry. Then it uses the value of the virtual block number's second index to access an entry in a level 2 table and it adds the virtual block number's block offset to the level 2 table entry to determine the location where it will store the data on the backing store container.

During a backup operation, to retrieve data from the backing store container the container manager uses the first index in the virtual block number to access the level 1 table for the beginning block number of the level 2 table. It indexes the level 2 table with the second index in the virtual block number and adds the block offset in the virtual block number to the level 2 table entry. Then it reads the data from that location in the backing store container.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
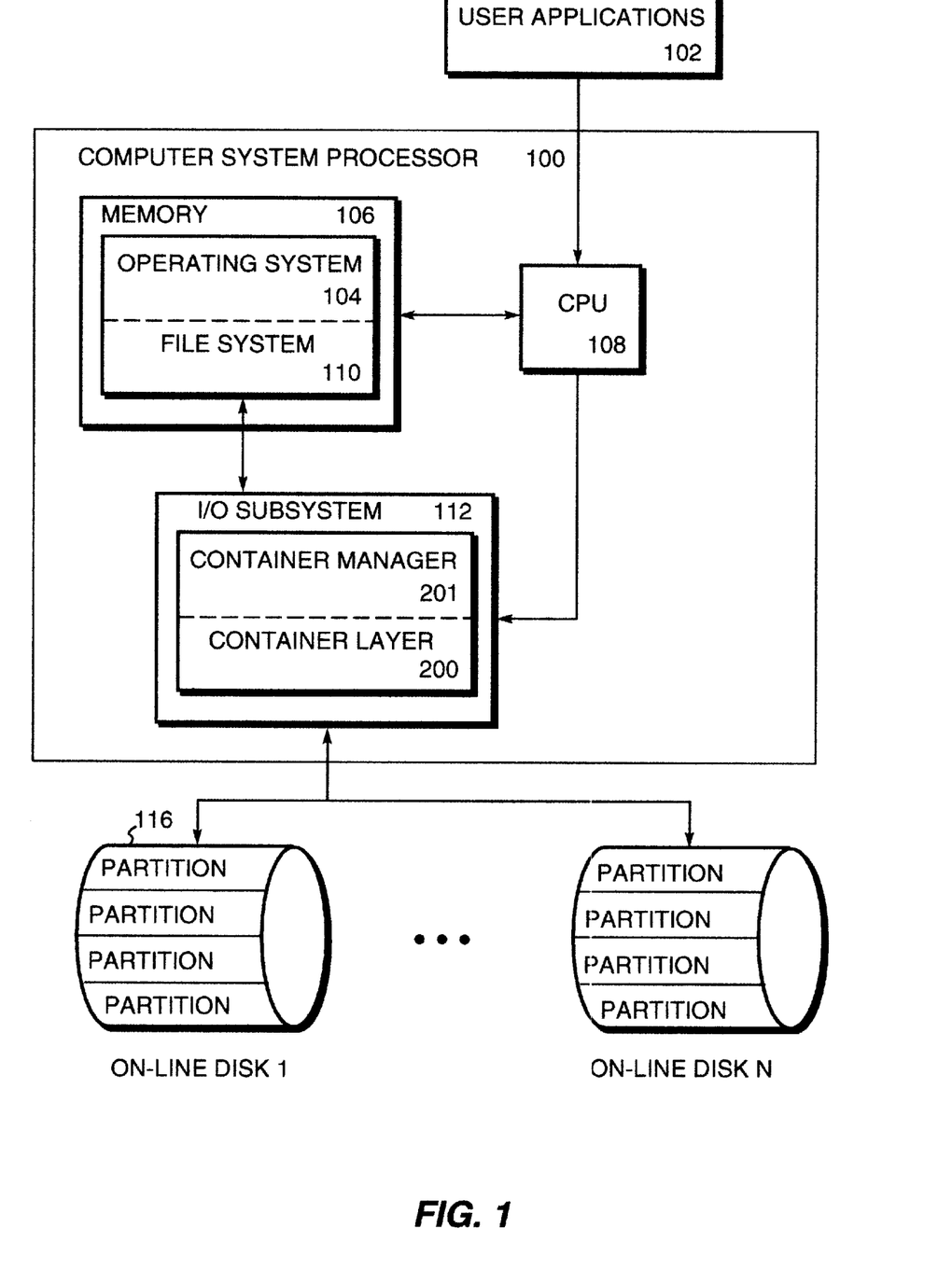
FIG. 1 is a schematic block diagram of a computer system in which the principles of the invention may be practiced.

FIG. 1 is a schematic block diagram of a typical computer system that is configured to perform copy-on-write procedure in accordance with the present invention. The computer system processor 100 comprises a memory 106 and an input/output (I/O) subsystem 112 interconnected with a central processing unit (CPU) 108. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. The I/O subsystem 112 is, in turn, connected to a set on-line storage devices 116. These on-line storage devices 116 are partitioned into units of physical space associated with the inventive copy-on-write procedure described herein.

User applications 102 and other internal processes in the computer system invoke I/O requests from the operating system 104 by file names. A file system 110, which is a component of the operating system 104, translates the file names into logical addresses. The file system 110 forwards the I/O requests to a I/O subsystem 112 which, in turn, converts the logical addresses into physical locations in the storage devices 116 and commands the latter devices to engage in the requested storage or retrieval operations. The I/O subsystem 112 configures the physical storage devices 116 partitions into containers and stores container configuration tables in the container layer 200 of the I/O subsystem 112. Container configuration enables the system administrator to partition a disk drive into one or more virtual disks.

Figure 2:
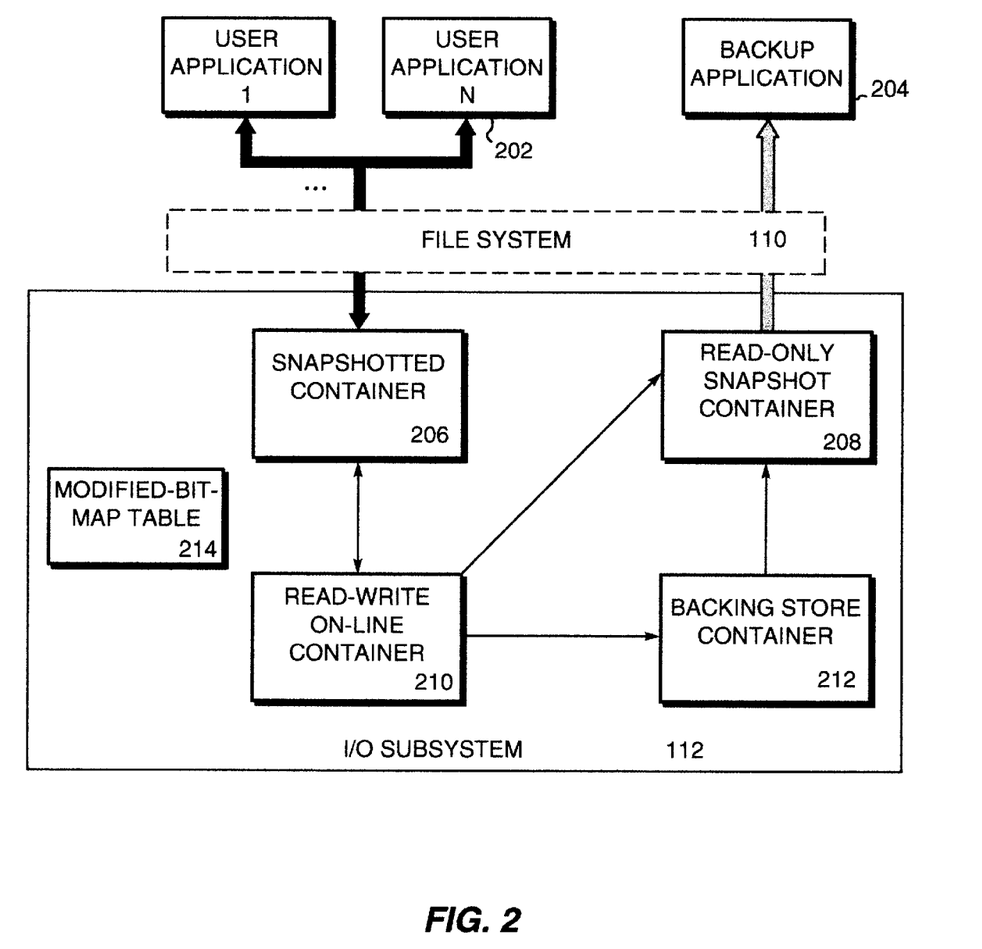
FIG. 2 is a schematic block diagram illustrating the components of a copy-on-write procedure in a computer system.

Typically, backup operations are performed at the request of a computer operator. In an illustrative backup approach embodiment, the file system instructs the I/O subsystem 112 to perform a conventional copy-on-write operation in response to the operator's request. As depicted in FIG. 2, in performing the copy-on-write procedure, the I/O subsystem 112 creates a snapshotted 206 container, a snapshot 208 container and a backing store 212 container. Each container has an associated container driver that process I/O requests for that container.

Before the copy-on-write procedure is performed, all I/O requests for data in the read-write container 210 go directly to the read-write container 210 driver. After the copy-on-write procedure all I/O requests go to the snapshotted container 206 driver. If the request is a storage request, the system checks the modified-bit-map table 214 to determine if the read-write container 210 block of data was modified after the snapshot 208 container was created. If the block was modified, the modified bit is set therefore, the snapshotted 206 container forwards the I/O request to the read-write on-line container 210 driver. If however, the block was not modified after snapshot 208 container was created, the container manager copies the unmodified block from the read-write container 210 to the backing store container 212 through the backing store container driver 212; the container manager sets the modified-bit-map table 214 for that block, and sends the I/O request to the read-write container 210 driver for storage in the read-write container 210.

During execution, backup processes 204 forward I/O requests for files to the snapshot container 208. The snapshot container 208 determines if the file has been modified by checking the modified-bit-map table 214 for the block where the file is stored. If the block has been modified, the snapshot container 208 driver obtains an unmodified copy of the block from the backing store 212 container. If the block has not been modified, the snapshot container 208 driver obtains the unmodified block from the read-write container 210. This ensures that backup processes 204 access an unchanging copy of the data from the time the snapshot is taken. In order to map the blocks copied from the read-write container 210 with the blocks in the backing store container 212, the system creates a backing store container 212 this is the same size as the read-write container 210. Yet, since most blocks in the read-write container 210 are usually not modified after the snapshot is taken, most of the backing store container's 212 space is not used. Such an event renders the incremental backup operation wasteful when using the conventional copy-on-write operation. The present invention is therefore directed to a mechanism for enabling reliable data mapping between copied blocks of data in the smaller backing store container 212 with original blocks of data in the larger read-write container 210.

Figure 3:
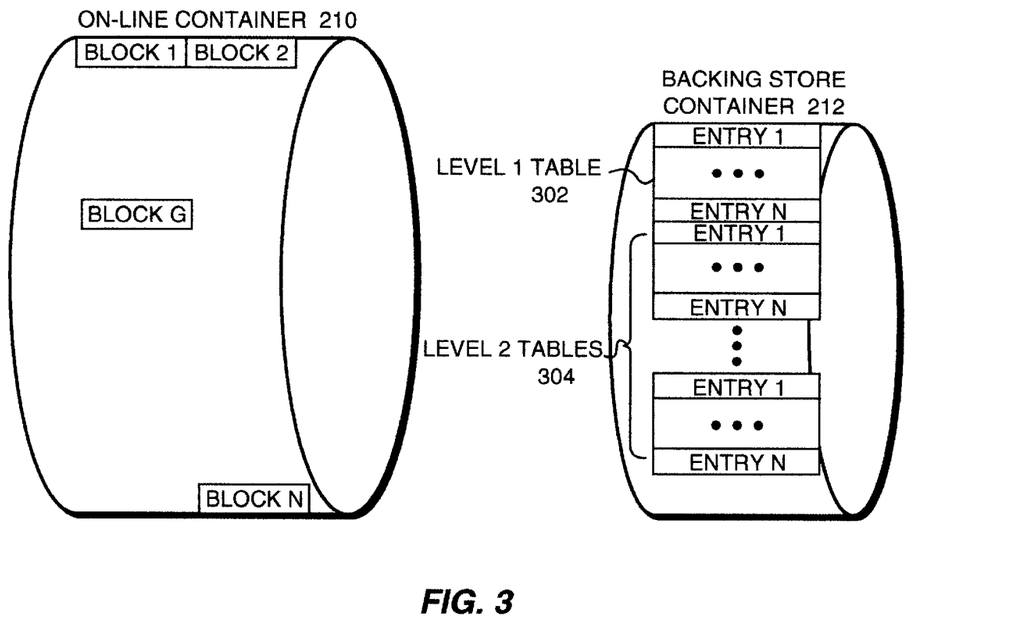
FIG. 3 illustrates the read-write on-line container and the backing store container used in the inventive copy-on-write procedure.

FIG. 3 depicts the mapping tables in the backing store container 212 used by the system to map the backing store container 212 blocks of data with the associated read-write on-line container 210 blocks of data. According to the preferred embodiment of the invention, during the copy-on-write operation, the container manager creates a level 1 table 302 in the backing store container 212; the level 1 table 302 contains addresses to a set of tables in the backing store container 212 where level 2 tables 304 are stored. The level 1 table 302 is always resident in memory and stored in the beginning of the backing store container 212. Initially all entries in the level 1 table 302 in memory are set zeros. When a block of data is copied from the read-write container 210 to the backing store container 212, the container manager creates a 2K longword level 2 table 304 in memory and in the backing store container 212 to store the block of data. The beginning block number in the level 2 table 304 is stored in an entry in the level 1 table 302. As more space is needed to store data, the container manager creates new level 2 tables 304 and swaps the level 2 tables 304 in and out of memory as needed.

Figure 4:
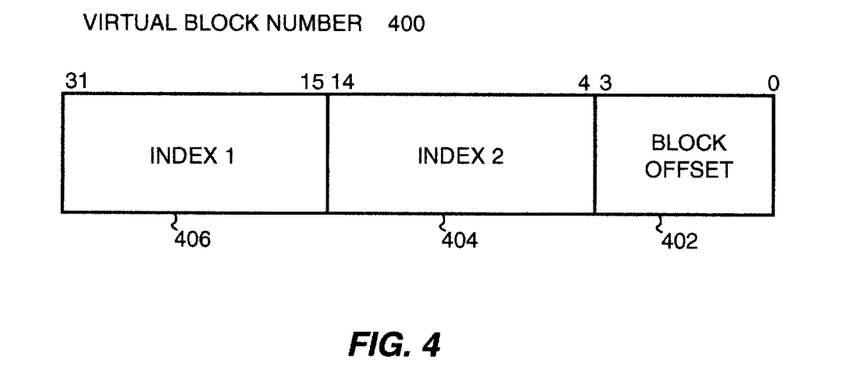
FIG. 4 is a schematic block diagram of a virtual block number used to index the backing store container depicted in FIG. 3.

In order to index the backing store container 212 tables, the container manager converts the physical read-write container 210 block number into a virtual block number 400. FIG. 4 is a schematic diagram showing the virtual block number 400 created by the system. Bits zero to three of the virtual block number is defined as the block offset 402, bits four to fifteen is defined as the second index 404, and bits sixteen to thirty-one is defined as the first index 406. The size of first index 406 is variable and increases as the size of the read-write container 210 increases. Note that the bits defining each entry in the virtual block number will change as the chunk size on the system changes. The system indexes the level 1 table 302 with the first index 406 in the virtual block number 400. Based on the block number in the level 1 table 302 entry, the system indexes the appropriate level 2 table 304 with the second index 404 in the virtual block number 400. The system then adds the block offset 402 in the virtual block number 400 to the level 2 table 304 index to obtain an address for a location where it will store or retrieve the block of data.

If the backing store container fills up before a backup process completes, the container manager sends errors to any application attempting to read data through the snapshot container 208 driver. The system administrator may thereafter remove the snapshot and start a new backup procedure with a bigger backing store container 212. Note also that the snapshotted container 206 never returns errors, so no user application 202 accessing the read-write container 210 is affected by the full backing store container.

Figure 5:
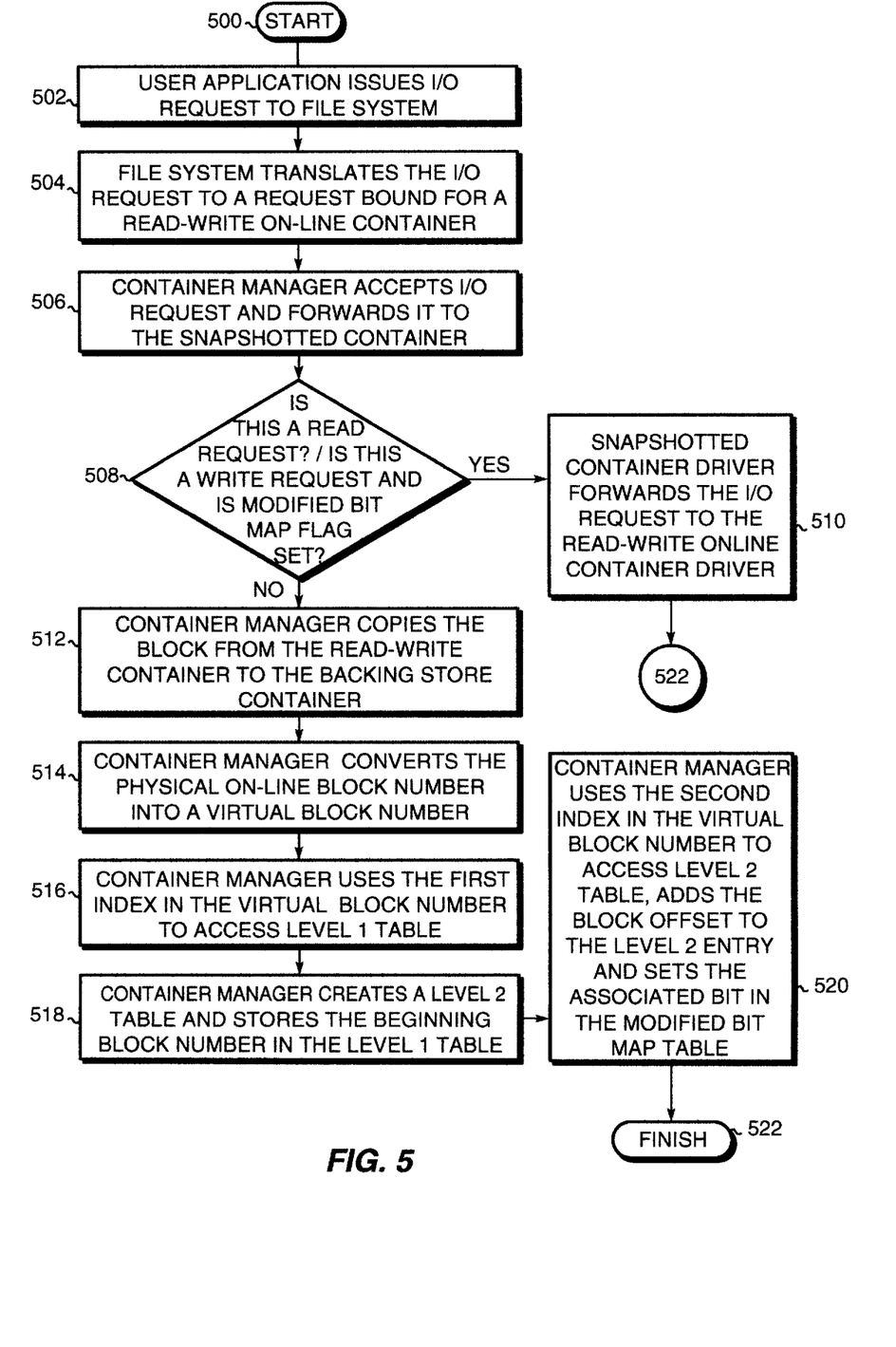
FIG. 5 is a flowchart illustrating the sequence of steps followed by a copy-on-write procedure.

FIG. 5 is a flowchart illustrating the sequence of steps employed when performing a copy-on-write procedure with the inventive block mapping in the backing store container 212. The sequence starts at Step 500 and proceeds to Step 502 where a user application 102 or system process issues an input I/O request to the file system 110. The file system 110 accepts the file-oriented I/O request and translates it into an I/O request bound for a read-write container 210 in the I/O subsystem 112 in Step 504. The container manager 201 in the I/O subsystem 112 accepts the I/O request from the file system 110 and forwards it to the snapshotted container driver 206 in Step 506. The container manager 201 checks to see if this is a read request or if it is a write request. If it is a write request, the container manager checks the modified-bit-map table 214 to determine if the read-write on-line block where the file is stored has been modified at Step 508. If the block has been modified, the snapshotted container 206 driver forwards the I/O request to the read-write on-line container driver 210 in Step 510.

If the block has not been modified(Step 508), the container manager 201 copies the unmodified block from the read-write container 210 to the backing store container 208 in Step 512. During the copy operation, the container manager 201 converts the physical read-write block number into a virtual block number 400 in Step 514. The container manager 201 uses the first index 406 in the virtual block number to index an entry in the level 1 table 302 in memory at Step 516. Then the container manager 201 creates a level 2 table 304 and stores the beginning block number for level 2 table 304 in the level 1 table 302 entry in Step 518. Then the container manager 201 uses the virtual block number's second index 404 to access an entry in the level 2 table 304. The container manager 201 adds the virtual block number's block offset 402 to the level 2 table 304 entry and the container manager 201 and sets the associated bit map in the modified-bit-map table 214 in Step 520.

Figure 6:
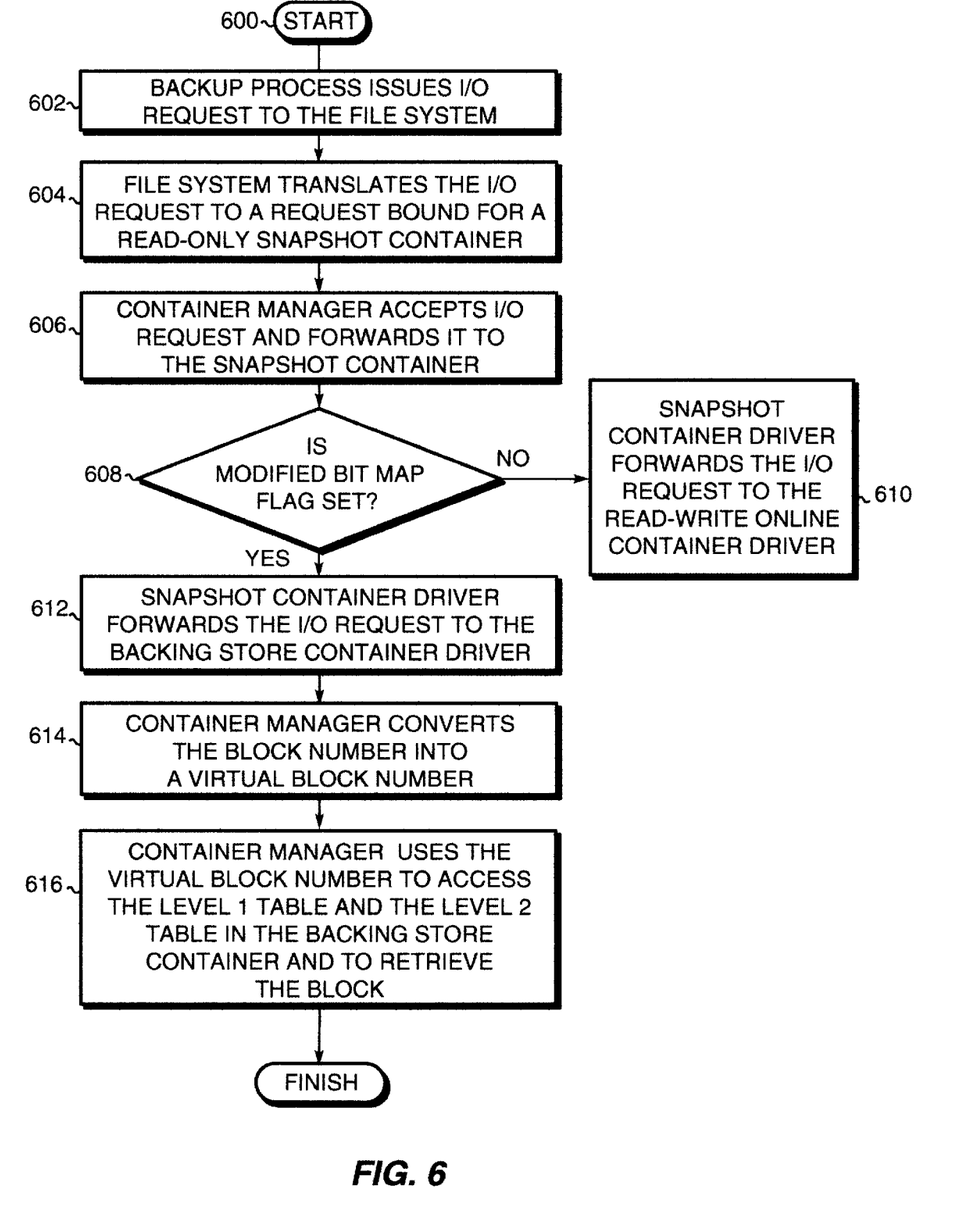
FIG. 6 is a flowchart illustrating the sequence of steps followed by a backup procedure.

FIG. 6 is a flowchart illustrating the sequence of steps employed when performing an backup operation with the inventive block mapping in the backing store container. The sequence starts at Step 600 and proceeds to Step 602 where backup process 204 issues an retrieval I/O request to the file system 110. The file system 110 accepts the fileoriented I/O request and translates it into an I/O request bound for the snapshot container 208 in the I/O subsystem 112 in Step 604. The container manager 201 accepts the I/O request from the file system 110 and forwards it to the snapshot container 208 driver in Step 606. The system checks the modified-bit-map 214 table to determine if the requested block where the file is stored has been modified(Step 608). If the block has not been modified, the snapshot driver forwards the I/O request to the read-write container driver in Step 610.

If the block has been modified(Step 608), the snapshot driver forwards the retrieval request to the backing store container driver in Step 612. The backing store container driver retrieves the block from the backing store containing by converting the physical read-write block number into a virtual block number at Step 614. The container manager uses the virtual block number first index 406 to index an entry in the level 1 table 302 in memory. Based on the block number in the level 1 table 302 entry, the container manager indexes the level 2 table with the virtual block number's second index. Then it adds the block offset 402 to the level 2 table 304 entry and retrieves the data from that location in Step 616.

Figure 7:
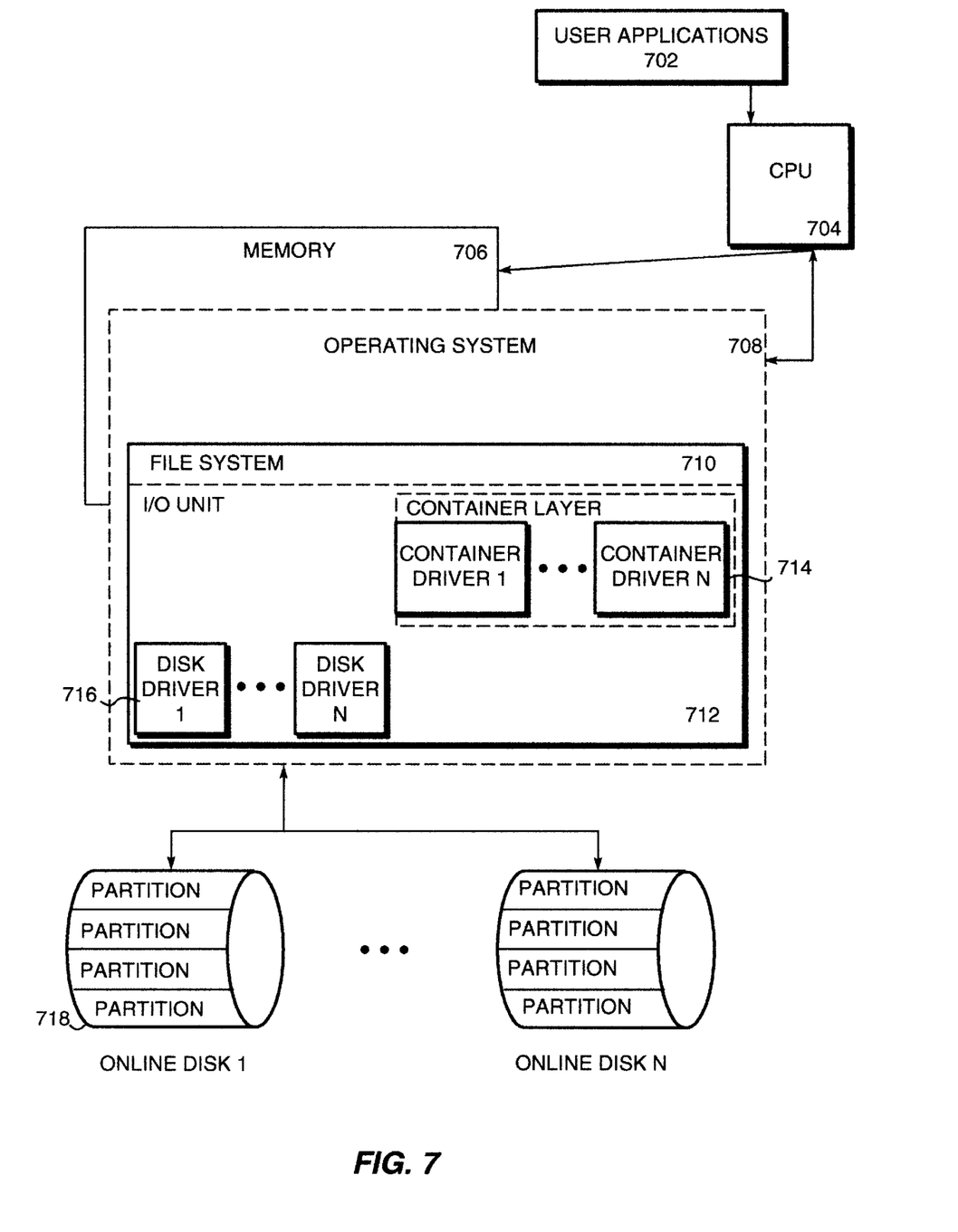
FIG. 7 illustrates a preferred embodiment of a data processing system configured to implement the backing store mapping table.

FIG. 7 is the preferred embodiment of a data processing platform configured to implement the smaller backup container mechanism. FIG. 7 depicts a memory 706 and an input/output (I/O) subsystem 712 interconnected with a central processing unit (CPU) 704. An operating system 704, handles I/O operations invoked by software processes or application programs executing on the computer. The I/O subsystem 712 comprises a container layer 714 which contains container drivers that perform I/O requests on each type of container in the system. The I/O subsystem 712 is, in turn, connected to a set online storage devices 718 through the appropriate disk drivers 816. An example of this file system 710 is the Windows NT File System (NTFS) configured to operate on the Windows NT operating system.

After a copy-on-write operation, when a user application 702 issues an I/O request to the CPU 704, the file system 710, which is a component of the operating system 708, initially attempts to resolve the request by searching the host computer memory 706; if it cannot, the file system 710 services the request by retrieving the file from disks 718 through the appropriate container driver 714 in the I/O Unit 712. The container driver 714 then forwards the I/O request to the appropriate disk driver 716 or container driver 714 with access to the physical disk drives 718.

Figure 8:
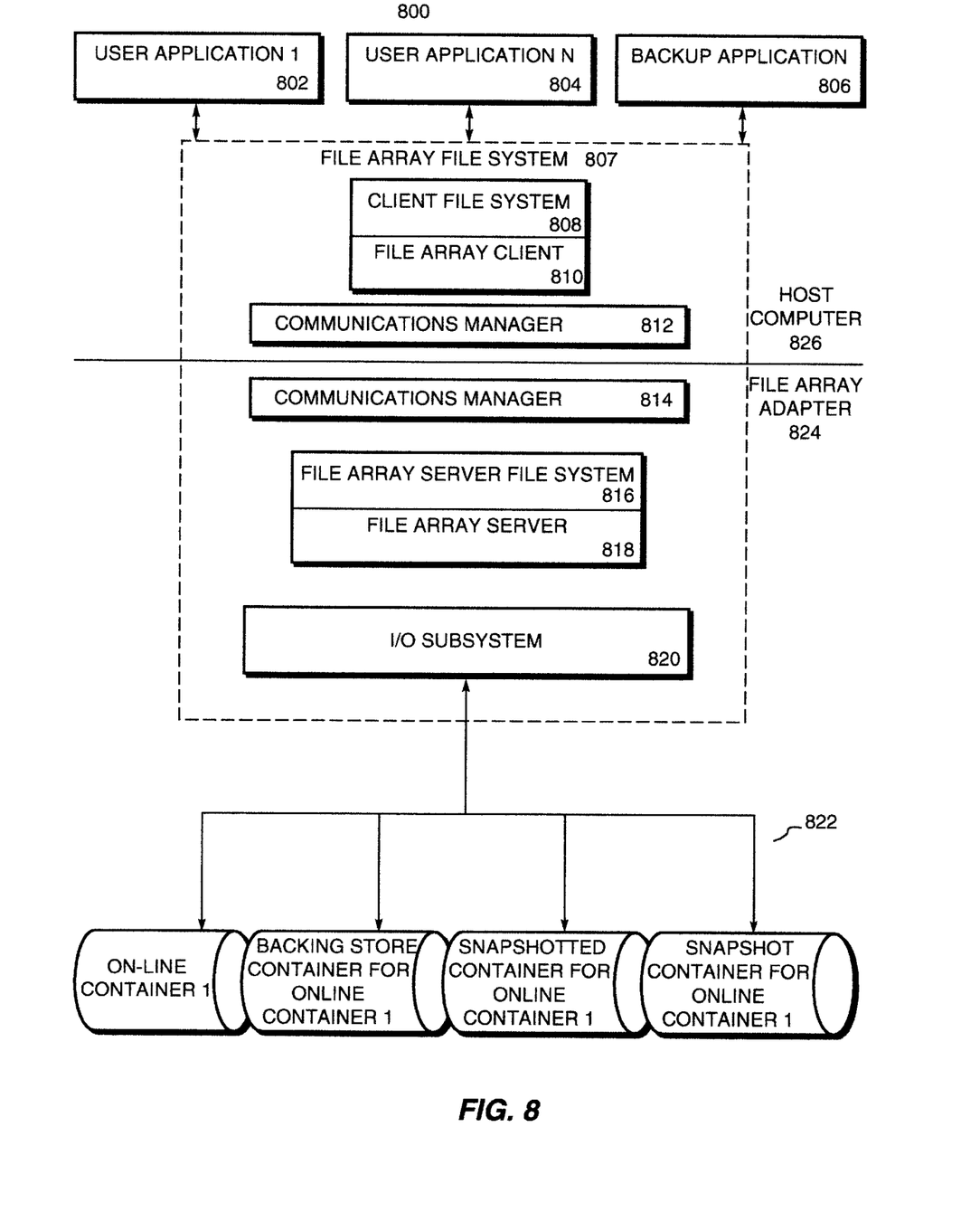
FIG. 8 illustrates an alternative embodiment of a data processing system having a distributed file system architecture configured to implement the backing store mapping tables.

While there has been shown and described an illustrative embodiment of a mechanism that enables container reconfiguration, it is to be understood that various other adaptations and modifications may be made within the spirit and scope of the invention. For example in an alternate embodiment of the invention, the file system and the I/O subsystem of the data processing platform need not be resident on the host computer but may, in fact, be distributed on multiple processors. FIG. 8 depicts such an alternative embodiment of the data processing platform configured to perform the container mapping mechanism. The data processing platform 800 comprises a host computer 826 coupled to a file array adapter 824 over a low latency interface. The distributed file array system architecture 800 includes a file array file system 807 which is preferably implemented in accordance with a modified client-server computing model. That is, the file system includes a client file system 808 located on the host computer 826 and a server file system is 816 resident on the adapter 824. The client file system 808 comprises a file array client 810 software driver component that interfaces with a communications manager software component 812; this latter component exchanges and processes I/O requests/responses over the interface with a complementary communications manager 814 of the adapter 824. The server file system 816 comprises, inter alia, a file array server driver 818 component. In addition, the architecture 800 includes a file array I/O subsystem 820 that is located entirely on the adapter 824. An example of a platform suitable for use with the present invention is described in copending and commonly-assigned U.S. patent application Ser. No. 08/964,304 titled, File Array Storage Architecture by Richard Napolitano et al., which application is hereby incorporated by reference as though fully set forth herein.

When performing I/O operation requests in support of a user application program executing on the platform, the client file system 808 initially attempts to resolve the request at the host computer 826; if it cannot, the client file system 808 sends commands to the server file system 816 for execution by server file system 816 or the I/O subsystem 820 of the file array adapter 824. In the case of a backup operation, the snapshot container, the snapshotted container, and the backup store container are all created and maintained in the I/O subsystem 820.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A computer system having a read/write container with locations for storage of blocks of read/write on-line data, said system further comprising a backup structure for backing up the on-line data at a instant in time, said backup structure comprising:

means for creating a backing store container that is smaller than the read/write container;

means for copying to the backing store container from the read/write container an unmodified copy of each block of on-line data that is to be modified subsequent to a predetermined snapshot time;

a mapping structure that maps the blocks of data in the backing store container with locations in the read-write container from which the blocks were copied;

means for converting a physical block number of a block of data in the read-write container to a virtual block number in the backing store container;

means for creating and storing a first level table in memory and in the backing store container;

means for creating and storing a second level table in the backing store container, said second level table storing a block of data that is copied from the read/write container to the backing store container;

means for accessing the first and second level tables in the backing store container using the virtual block number; and means for storing a beginning block number of the second level table in a first level table entry.

2. The system of claim 1 further comprising:

means for accessing an entry in the first level table using the first index of the virtual block number;

means for obtaining a beginning block number of the second level table from the first level table entry;

means for accessing an entry in the second level table using the second index of the virtual block number;

means for obtaining an address from the second level table entry; and means for adding the block offset of the virtual block number to the address from the second level table entry to determine a physical location in the backing store container where a block of data is stored.

3. The method of claim 1 further comprising means for returning an error in response to retrieving data from a full backing store container in order for a system operator to restart the backup process with a larger backing store container.

4. A method for backing up on-line data from a read/write container with locations for storage of blocks of read/write on-line data, said method comprising the steps of:

creating a backing store container that is smaller than the read/write container;

copying an unmodified copy of each block of on-line data for modification subsequent to a predetermined snapshot time from the read-write container to the backing store container;

mapping blocks of data in the backing store container with locations in the read-write container from which the blocks were copied;

converting a physical block number of a block of data in the read-write container into a virtual block number in the backing store container;

creating a first index, a second index and a block offset in the virtual block number;

creating and storing a first level table in memory and in the backing store container in response to the step of creating the backing store; and creating and storing a second level table in the backing store container, said second level table storing a block of data that is copied from the read/write container to the backing store container;

using the virtual block number to access the first and second level tables in the backing store container; and storing a beginning block number of the second level table in a first level table entry.

5. The method of claim 4 further comprising the steps of:

using the first index of the virtual block number to access an entry in the first level table;

obtaining a beginning block number of the second level table from the first level table entry;

using the second index of the virtual block number to access an entry in the second level table;

obtaining an address from the second level table entry; and adding the block offset of the virtual block number to the address from the second level table entry to determine a physical location in the backing store container where a block of data is stored.

6. The method of claim 5 further comprising the step of returning an error in response to retrieving data from a full backing store container in order for a system operator to restart the backup process with a larger backing store container.

7. A method of mapping a block of data for modification subsequent to a predetermined snapshot time in a read/write container to a physical block in a backing store container, said method comprising the steps of:

converting a physical block number of the block of data in the read/write container to a virtual block number, the virtual block number having a first index, a second index and a block offset;

creating a first level table in the backing store container;

accessing an entry in the first level table with the value of the first index of the virtual block number;

creating a second level table if one does not exist or if the existing one is too small;

storing a beginning block number of the second level table in the first level table entry;

accessing an entry in the second level table using the second index in the virtual block number; and adding the block offset in the virtual block number to the second level table entry to determine a physical location in the backing store container for storing the data.

8. The method of claim 7 further comprising the steps of, in response to the steps of converting:

defining low order bits of the virtual block number as the block offset;

defining middle level bits of the virtual block number as the second index; and defining high order bits of the virtual block number as the first index.

9. The method of claim 8 further comprising creating a backing store container that is smaller in storage size than the read/write container.

10. The method of claim 9 further comprising returning an error in response to retrieving data from a full backing store container in order for a system operator to restart the backup process with a larger backing store container.

* * * * *